(12) United States Patent
Mitra et al.

(10) Patent No.: US 11,544,281 B2
(45) Date of Patent: Jan. 3, 2023

(54) QUERY-ORIENTED APPROXIMATE QUERY PROCESSING BASED ON MACHINE LEARNING TECHNIQUES

(71) Applicant: Adobe Inc., San Jose, CA (US)

(72) Inventors: Subrata Mitra, Karnataka (IN); Nikhil Sheoran, Chandigarh (IN); Anup Rao, San Jose, CA (US); Tung Mai, San Jose, CA (US); Sapthotharan Krishnan Nair, Santa Clara, CA (US); Shivakumar Vaithyanathan, San Jose, CA (US); Thomas Jacobs, Cupertino, CA (US); Ghetia Siddharth, Gujarat (IN); Jatin Varshney, Uttar Pradesh (IN); Vikas Maddukuri, Andhra Pradesh (IN); Laxmikant Mishra, Maharashtra (IN)

(73) Assignee: Adobe Inc., San Jose, CA (US)

( * ) Notice: Subject to any disclaimer, the term of this patent is extended or adjusted under 35 U.S.C. 154(b) by 42 days.

(21) Appl. No.: 17/100,618

(22) Filed: Nov. 20, 2020

(65) Prior Publication Data
US 2022/0164346 A1 May 26, 2022

(51) Int. Cl.
*G06F 16/2458* (2019.01)
*G06F 16/215* (2019.01)
(Continued)

(52) U.S. Cl.
CPC ........ *G06F 16/2462* (2019.01); *G06F 16/215* (2019.01); *G06F 16/2237* (2019.01);
(Continued)

(58) Field of Classification Search
None
See application file for complete search history.

(56) References Cited

U.S. PATENT DOCUMENTS

2004/0249810 A1* 12/2004 Das .................... G06F 16/2462
707/999.005
2008/0288473 A1* 11/2008 Hu ...................... G06F 16/2458
(Continued)

OTHER PUBLICATIONS

Sheoran et al., "Conditional Generative Model based Predicate-Aware Query Approximation", 2022 (Year: 2022).*
(Continued)

*Primary Examiner* — Dawaune A Conyers
(74) *Attorney, Agent, or Firm* — Kilpatrick Townsend & Stockton LLP

(57) ABSTRACT

In some embodiments, a model training system trains a sample generation model configured to generate synthetic data entries for a dataset. The sample generation model includes a prior model for generating an estimated latent vector from a partially observed data entry, a proposal model for generating a latent vector from a data entry of the dataset and a mask corresponding to the partially observed data entry, and a generative model for generating the synthetic data entries from the latent vector and the partially observed data entry. The model training system trains the sample generation model to optimize an objective function that includes a first term determined using the synthetic data entries and a second term determined using the estimated latent vector and the latent vector. The trained sample generation model can be executed on a client computing device to service queries using the generated synthetic data entries.

20 Claims, 9 Drawing Sheets

(51) Int. Cl.
*G06F 16/28* (2019.01)
*G06F 16/22* (2019.01)
*G06N 20/00* (2019.01)
*G06K 9/62* (2022.01)

(52) U.S. Cl.
CPC ......... *G06F 16/285* (2019.01); *G06K 9/6256* (2013.01); *G06K 9/6277* (2013.01); *G06N 20/00* (2019.01)

(56) References Cited

U.S. PATENT DOCUMENTS

2018/0181542 A1* 6/2018 Nica ................. G06F 17/18
2020/0012892 A1* 1/2020 Goodsitt ............ G06K 9/6262

OTHER PUBLICATIONS

Li et al., "Approximate Query Processing: What is New and Where to Go?", 2018 (Year: 2018).*

Agarwal et al., BlinkDB: Queries with Bounded Errors and Bounded Response Times on Very Large Data, Available Online at: https://sameeragarwal.github.io/blinkdb_eurosys13.pdf, 2013, pp. 29-42.

Eichmann et al., A Benchmark for Interactive Data Exploration, In Proceedings of the 2020 ACM SIGMOD International Conference on Management of Data, SIGMOD '20, Association for Computing Machinery, Jun. 14-19, 2020, pp. 1555-1569.

Ivanov et al., Variational Autoencoder with Arbitrary Conditioning, In International Conference on Learning Representations, Available Online at: https://arxiv.org/pdf/1806.02382.pdf, Jun. 27, 2019, pp. 1-25.

Li, Box-Cox Transformations: An Overview, Available Online at: https://www.ime.usp.br/~abe/lista/pdfm9cJKUmFZp.pdf, Apr. 11, 2005, 45 pages.

Liang et al., Assessing Beijing's PM2.5 Pollution: Severity, Weather Impact, APEC and Winter Heating, Proceedings of the Royal Society A: Mathematical, Physical and Engineering Sciences, vol. 471, No. 2182, Oct. 8, 2015, pp. 1-20.

Liu et al., The Effects of Interactive Latency on Exploratory Visual Analysis, Available Online at: https://idl.cs.washington.edu/files/2014-Latency-InfoVis.pdf, 2014, 10 pages.

Ma et al., DBEst: Revisiting Approximate Query Processing Engines with Machine Learning Models, SIGMOD, Available Online at: https://dl.acm.org/doi/pdf/10.1145/3299869.3324958, Jun. 30-Jul. 5, 2019, pp. 1553-1570.

Park et al., VerdictDB: Universalizing Approximate Query Processing, SIGMOD, Available Online at https://arxiv.org/pdf/1804.00770.pdf, Nov. 8, 2018, 19 pages.

Rahman, Understanding Conditional Variational Autoencoders, Towards Data Science, Accessed from internet on Oct. 13, 2020, pp. 1-7.

Thirumuruganathan et al., Approximate Query Processing for Data Exploration using Deep Generative Models, Available Online at: https://arxiv.org/pdf/1903.10000.pdf, Nov. 18, 2019, 12 pages.

Yang et al., Deep Unsupervised Cardinality Estimation, Proceedings of the VLDB Endowment, vol. 13, No. 3, Nov. 2019, pp. 279-292.

* cited by examiner

FIG. 3

QUERY-ORIENTED APPROXIMATE QUERY PROCESSING BASED ON MACHINE LEARNING TECHNIQUES

TECHNICAL FIELD

This disclosure relates generally to machine learning techniques that facilitate query processing. Specifically, the present disclosure involves using machine learning techniques to build and train approximate query processing models by accounting for the queries to be handled by the models.

BACKGROUND

Datastore systems can service online queries by executing the queries over the datasets stored in the datastore systems. However, servicing online queries on large datasets by a large number of users requires a significant amount of network bandwidth, computing power, and storage resources.

For some applications, such as trend-based analysis or exploratory investigation, obtaining the exact query results may not be necessary and approximate search results would be sufficient. For these applications, approximate query processing (AQP) models can be employed to generate approximate search results as close as to the exact answer efficiently without querying the original datasets. In some AQP techniques, machine learning (ML) models are used to answer the queries approximately.

Existing ML-model-based AQP techniques, however, are insufficient to handle various search queries that might be submitted to the dataset. This is because these models are trained without accounting for the search queries. For example, the accuracy of these AQP models drops if a search query includes a condition limiting the search results to have a certain attribute value. As the number of conditions in the search query increases, the accuracy of the existing AQP models significantly decreases, rendering these AQP models unusable to service the search queries.

SUMMARY

Certain embodiments involve query-oriented approximate query processing based on machine learning techniques. A model training system trains a sample generation model that is configured to generate synthetic data entries for a dataset. The sample generation model includes a prior model, a proposal model, and a generative model. The prior model is utilized to generate an estimated latent vector from a partially observed data entry. The proposal model is utilized to generate a latent vector from a data entry of the dataset and a mask corresponding to the partially observed data entry. The generative model is for generating the synthetic data entries from the latent vector and the partially observed data entry. The model training system trains the sample generation model to optimize an objective function that includes a first term determined using the synthetic data entries and a second term determined using the estimated latent vector and the latent vector. The trained sample generation model which includes the prior model and the generative model is sent to and be executed on a client computing device to service queries using the generated synthetic data entries.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 depicts an example of a dataset to be queried and for which a sample generation model is to be built, according to certain embodiments of the present disclosure.

DETAILED DESCRIPTION

Figure 1:
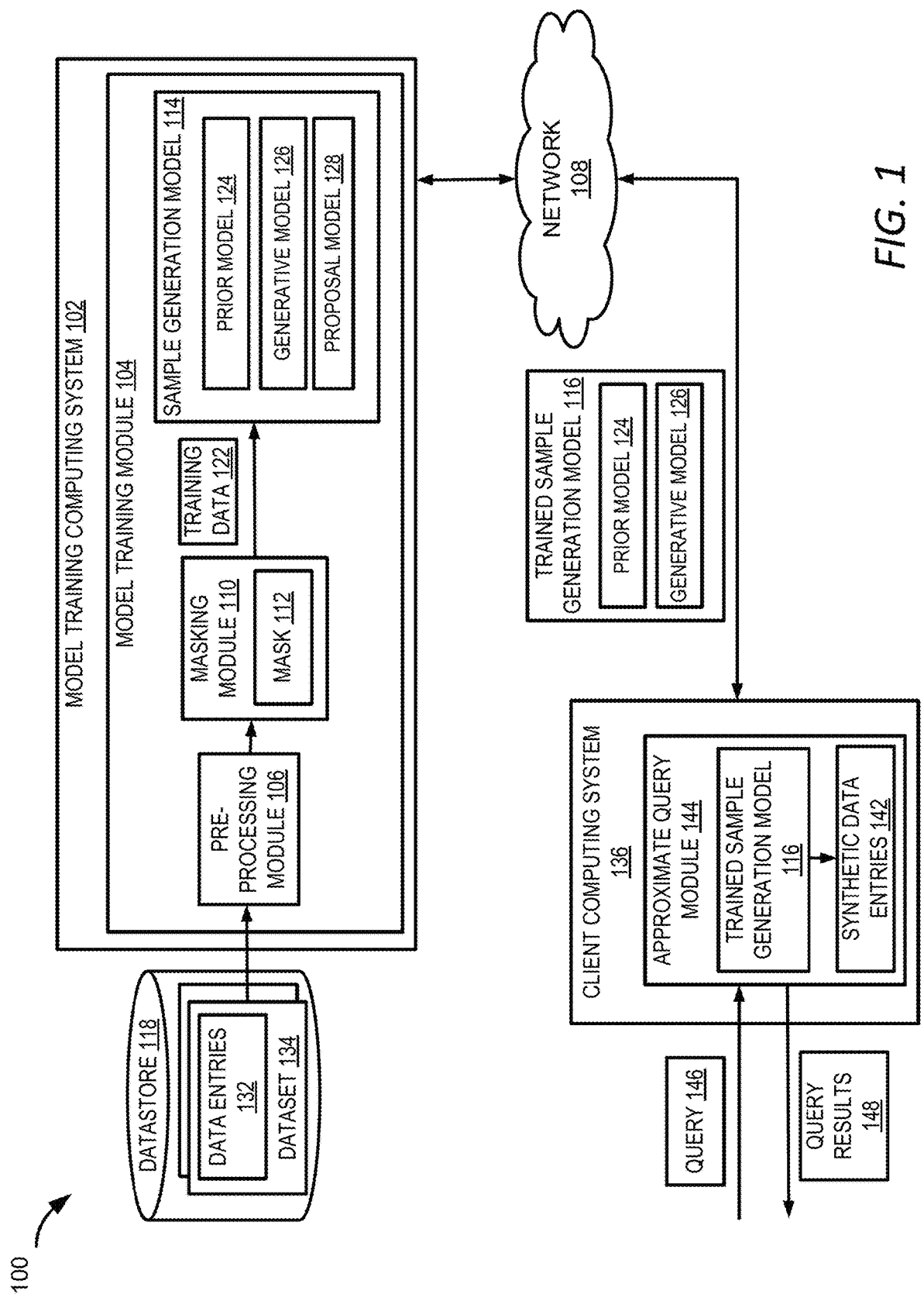
FIG. 1 depicts an example of a computing environment for query-oriented approximate query processing based on machine learning models, according to certain embodiments of the present disclosure.

The present disclosure involves query-oriented approximate query processing based on machine learning techniques. A model training computing system trains a sample generation model using training samples generated from the original data entries in a dataset. The model training computing system generates the training samples by masking the original data entries in a way that simulates various conditions in search queries. By doing so, the sample generation model is trained to capture the conditional distribution of the data entries. The trained sample generation model is deployed to a client computing device that uses the sample generation model to generate synthetic data entries for a query given an input representing the conditions in the query. The query can be, for example, an aggregate query (e.g., a query requesting an aggregation of the search results, such as summation, averaging) associated with conditions (e.g., conditions specified in the WHERE clause of the query to require certain attributes to have a certain value).

The following non-limiting example is provided to introduce certain embodiments. In this example, a model training computing system accesses a dataset containing multiple data entries. Each of the data entries contains multiple data attributes. These data attributes are classified into numerical data attributes, whose values are numerical numbers such as the number of visits to a website, and categorical data attributes, whose values represent a finite number of categories such as the type of web browser used by users to visit a website. To facilitate the learning of the distribution of the dataset, the model training computing system pre-processes the dataset so that the data in the dataset follows Gaussian distribution or otherwise can be represented by Gaussian distributions.

The model training computing system further masks the dataset to generate training data for the sample generation model. The masking removes values of numerical attributes in the dataset and values of a portion of the categorical attributes. As a result, the generated training data contains partially observed data entries. Each of the partially observed data entry corresponds to an original data entry but only has values for a portion of the categorical data attributes, referred to as "observable data attributes." The remaining values are removed by the masking process and become "unobservable data attributes." The partially observed data entry, or more specifically the observable data attributes of the partially observed data entry, represents conditions that might be included in a search query. For instance, a partially observable data entry with observable data attributes "browser type" taking the value of "Chrome®" can represent the condition "browser type=Chrome®" in a search query. Different conditions can be represented by masking the data entries differently. As such, the generated training data can be used to represent various conditions that might be included in the runtime search queries.

The model training computing system utilizes the generated masked training data to train the sample generation model. At training, the sample generation model includes three sub-models: a prior model, a generative model, and a proposal model. The prior model is configured to generate an estimated latent vector from a partially observed data entry and a mask indicating the observable data attributes and unobservable data attributes in the data entry. The proposal model is configured to generate a latent vector from the original data entry of the dataset and the mask. The generative model is configured to generate the synthetic data entries from the latent vector, the partially observed data entry, and the mask. An objective function of the training can include a first term capturing the reconstruction error based on the synthetic data entries and a second term measuring the statistical distance between the estimated latent vector and the latent vector. Training the sample generation model involves optimizing the objective function to reduce the reconstruction error and the statistical distance.

The model training computing system sends the trained sample generation model to a client computing device so that the client computing device can service a query without querying the original dataset. To do so, the client computing device parses the query to determine the conditions specified in the query. The client computing device further converts the determined conditions to inputs to the sample generation model. The input includes a mask vector and a partially observed data entry representing the one or more conditions. The partially observed data entry includes multiple data attributes that contain observable data attributes having associated values (the values specified in the conditions) and unobservable data attributes. The mask vector indicates the positions of the observable or unobservable data attributes in the data entry.

At runtime, the trained sample generation model only includes the prior model for generating a latent vector from the input partially observed data entry and the mask vector and a generative model for generating the synthetic data entries from the latent vector given the partially observed data entry and the mask vector. The client computing device further executes the query on the generated synthetic data entries to obtain search results. For certain types of queries, such as the queries requiring aggregation as a summation or a total number count, the client computing device further estimates the cardinality of the query and updates the search results with the estimated cardinality before outputting the search results.

As described herein, certain embodiments provide improvements in data query by generating query-oriented approximate query processing models based on machine learning techniques. Since the sample generation model is trained by accounting for the conditions that might be included in the search query, the sample generation model can more accurately model the distribution of the dataset when the search query includes one or more conditions. As a result, when a query is received, synthetic data entries suitable for the query can be generated and more accurate search results can be obtained by executing the query on the generated synthetic data entries.

Because the synthetic data entries are accurate and can be utilized to satisfy the search query, the need to search the original dataset is eliminated. This reduces the response time of returning the search results. It also reduces the network bandwidth consumption and computational resource consumption at the server end. Further, because the model generation process generates highly targeted samples based on the specified conditions, the size of the generated synthetic data entries are smaller than the size of the generated synthetic data entries of the existing approach. Therefore, the storage resource consumption at each client computing system is also reduced.

Example Operating Environment

Referring now to the drawings, FIG. 1 depicts an example of a computing environment 100 for query-oriented approximate query processing based on machine learning models. The computing environment 100 includes a model training computing system 102, which includes one or more processing devices configured to execute a model training module 104 for training a sample generation model 114. The model training module 104 further includes a pre-processing module 106 for pre-processing data for the sample generation model, and a masking module 110 for generating training data for the sample generation model 114.

The computing environment 100 further includes a datastore 118 for storing data used in the training process, such as datasets 134. Each dataset includes multiple data entries 132. The data entries 132 of dataset 134 are the original data that a search query should be applied to if exact search results are to be obtained for the query. The data entries 132 can include any type of data depending on the application. In some examples, each data entry 132 in the datastore 118 includes multiple data attributes and these data attributes are classified into categorical data attributes and numerical data attributes. Numerical data attributes include data attributes whose values are numerical numbers (e.g., the number of visits to a website) and categorical data attributes include data attributes whose values represent a finite number of categories (e.g., the type of web browser used by users to visit a website). The computing environment 100 also includes a client computing system 136 where an approximate query module 144 is executed to service a query 146 locally using a trained sample generation model 116.

To train the sample generation model 114 for a dataset 134, the model training module 104 accesses the data entries 132 in the dataset 134. Because the data entries 132 may be generated or collected from a variety of applications, the distributions of the data attributes of the data entries 132 may be any type of distributions. These distributions may not be suitable for model training and for the sample generation model 114 to learn. As such, in some implementations, the model training module 104 employs the pre-processing module 106 to pre-process the data entries 132. The pre-processing can include, for example, representing the numerical data attributes using one or more Gaussian distributions, transforming one or more of the numerical data attributes into a Gaussian distribution, or a combination thereof. Additional details regarding pre-processing the data entries 132 in a dataset 134 are provided below with regard to FIG. 2.

Using the pre-processed data entries 132, the model training module 104 generates training data 122 to train the sample generation model 114 for the dataset 134. In some examples, the model training module 104 utilizes a masking module 110 to generate the training data 122. In order for the training of the sample generation model 114 to take into account the conditions that might be specified in a search query, the masking module 110 masks certain data attributes in the data entries 132. As a result, the generated training data 122 contain partially observed data entries. Each of the partially observed data entry corresponds to an original data entry 132 but only has values for a portion of the data attributes, i.e., the "observable data attributes." The remaining values are removed by the masking process and become "unobservable data attributes." The partially observed data entry, or more specifically the observable data attributes of the partially observed data entry, represents conditions that might be included in a search query. For instance, a partially observable data entry with observable data attributes "browser type" taking the value of "Chrome®" can represent the condition "browser type=Chrome®" in a search query. Different conditions can be represented by masking the data entries differently. As such, the generated training data can be used to represent various conditions included in the runtime search queries. The masking process can be represented by a mask 112 indicating the data attributes that are removed from the data entries 132. Additional details regarding pre-processing the data entries 132 are provided below with regard to FIGS. 2-4.

Using the generated training data 122, the model training module 104 trains the sample generation model 114 for the corresponding dataset 134. In some examples, the sample generation model 114 includes a prior model 124 configured for generating an estimated latent vector from a partially observed data entry and the mask corresponding to the partially observed data entry. The sample generation model 114 further includes a proposal model 128 configured for generating a latent vector from a data entry 132 of the dataset 134 that corresponds to the partially observed data entry and the mask. The sample generation model 114 further includes a generative model 126 configured for generating synthetic data entries from the latent vector, the partially observed data entry, and the mask.

During the training, the model training module 104 modifies parameters of the sample generation model 114 to optimize an objective function to reduce the reconstruction error and the statistical distance. The objective function includes a first term determined using the synthetic data entries generated by the generative model 126 and a second term determined using the estimated latent vector generated by the prior model 124 and the latent vector generated by the proposal model 128. Additional details regarding training the sample generation model 114 are provided below with regard to FIGS. 2, 5, and 6.

After the training, the sample generation model 114 can be deployed to client computing devices to generate synthetic data entries 142 to service search query locally without searching the data entries 132. For example, as shown in FIG. 1, the model training computing system 102 sends a trained sample generation model 116 to a client computing system 136 over a network 108. The network 108 may be a local-area network ("LAN"), a wide-area network ("WAN"), the Internet, or any other networking topology known in the art that connects the model training computing system 102 to the client computing system 136. The trained sample generation model 116 is different from the sample generation model 114 used during the training in that the trained sample generation model 116 does not include the proposal model 128. The client computing system 136 executes the trained sample generation model 116 in an approximate query module 144. The approximate query module 144 can be a stand-alone application or a module embedded in another application, such as a web browser (implemented through JavaScript).

When query 146 is received, the approximate query module 144 parses the query and extracts conditions specified in the query 146 to generate inputs to the trained sample generation model 116. Depending on the conditions specified in the query 146, one or multiple inputs to the trained sample generation model 116 can be generated. The approximate query module 144 feeds these inputs to the trained sample generation model 116 to generate synthetic data entries 142. The approximate query module 144 further executes the query 146 on the synthetic data entries 142 to generate the query results 148. For certain types of queries, such as the queries requiring aggregation as summation or a total number count, the approximate query module 144 further estimates the cardinality of the query 146 and updates the query results 148 with the estimated cardinality before outputting the search results. Additional details regarding utilizing the trained sample generation model 116 to service a query 146 locally at the client computing system 136 are provided below with regard to FIGS. 7 and 8.

Figure 2:
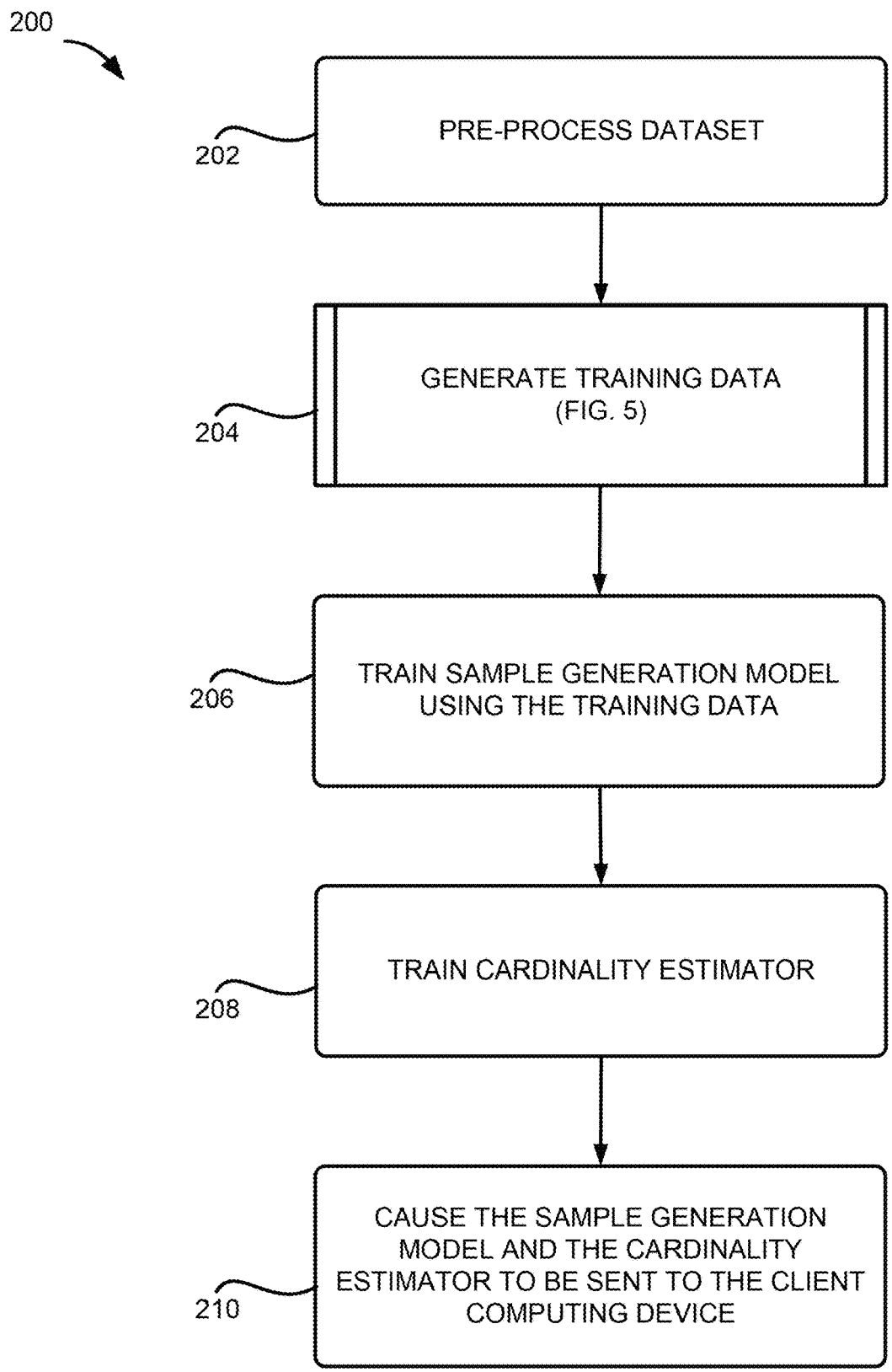
FIG. 2 depicts an example of a process for training a query-oriented approximate query processing model using machine learning models, according to certain embodiments of the present disclosure.
Figure 3:
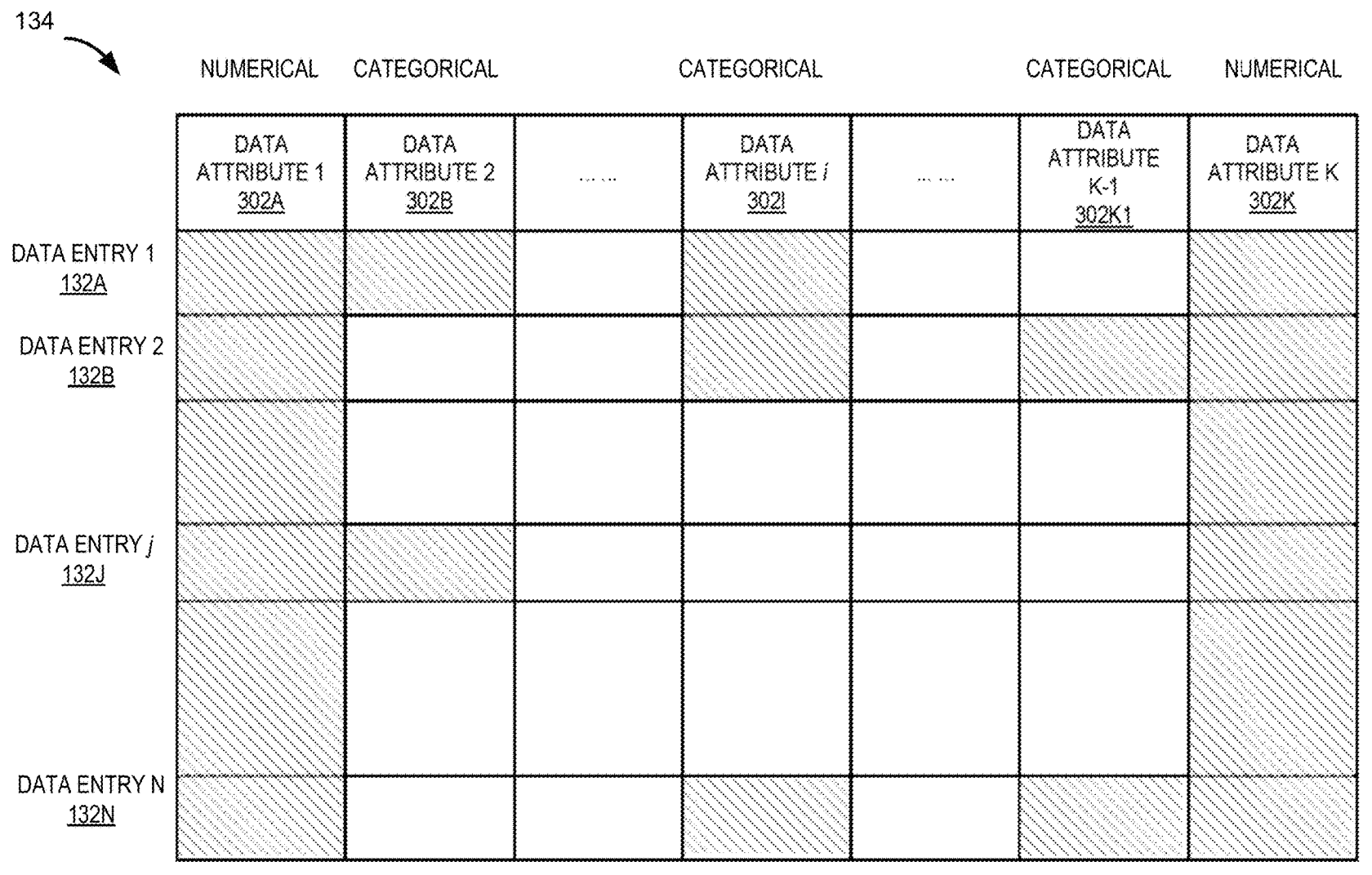
Figure 4:
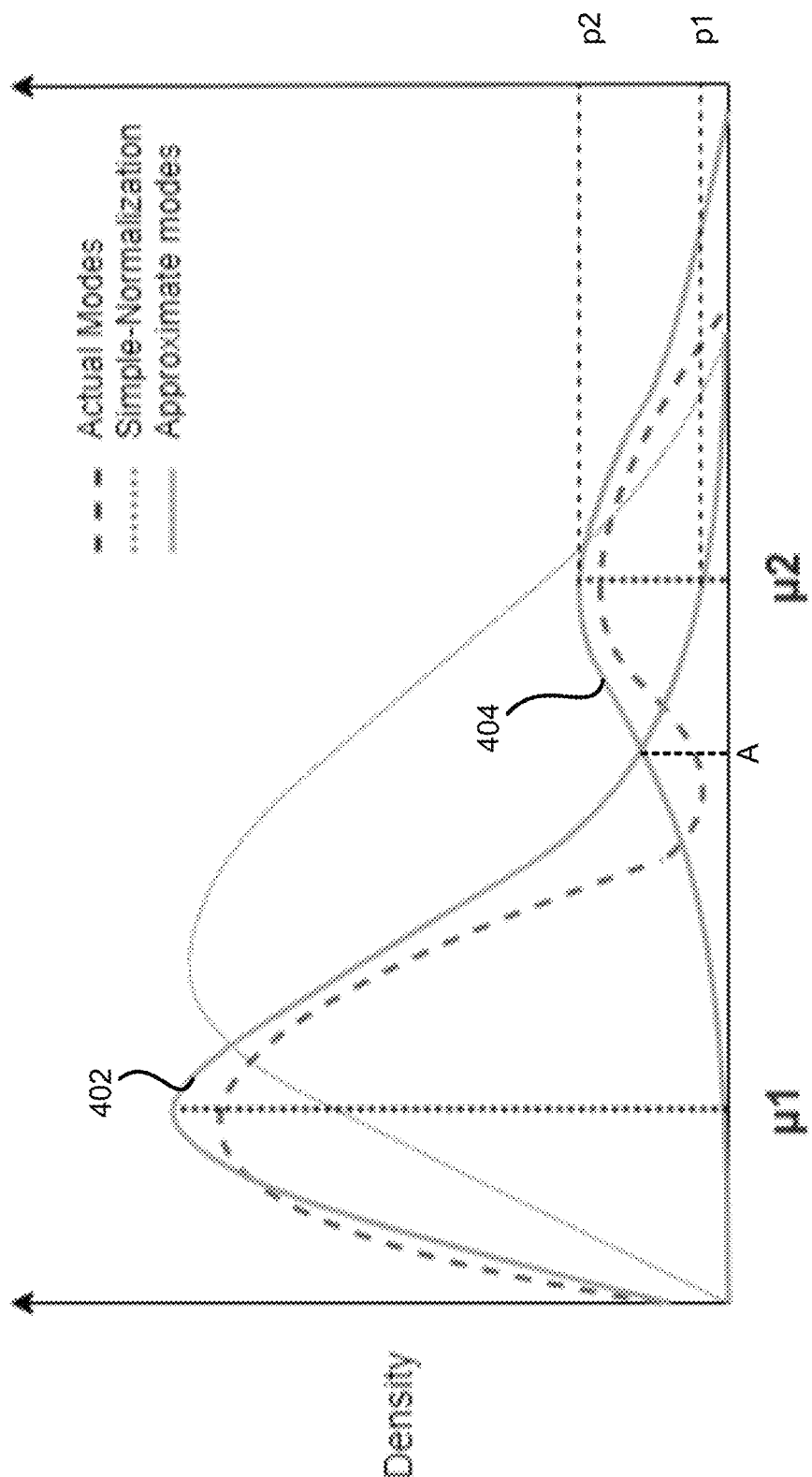
FIG. 4 depicts an example of a distribution of a numerical data attribute and the normalization of the numerical data attribute using Gaussian distributions, according to certain embodiments of the present disclosure.
Figure 5:
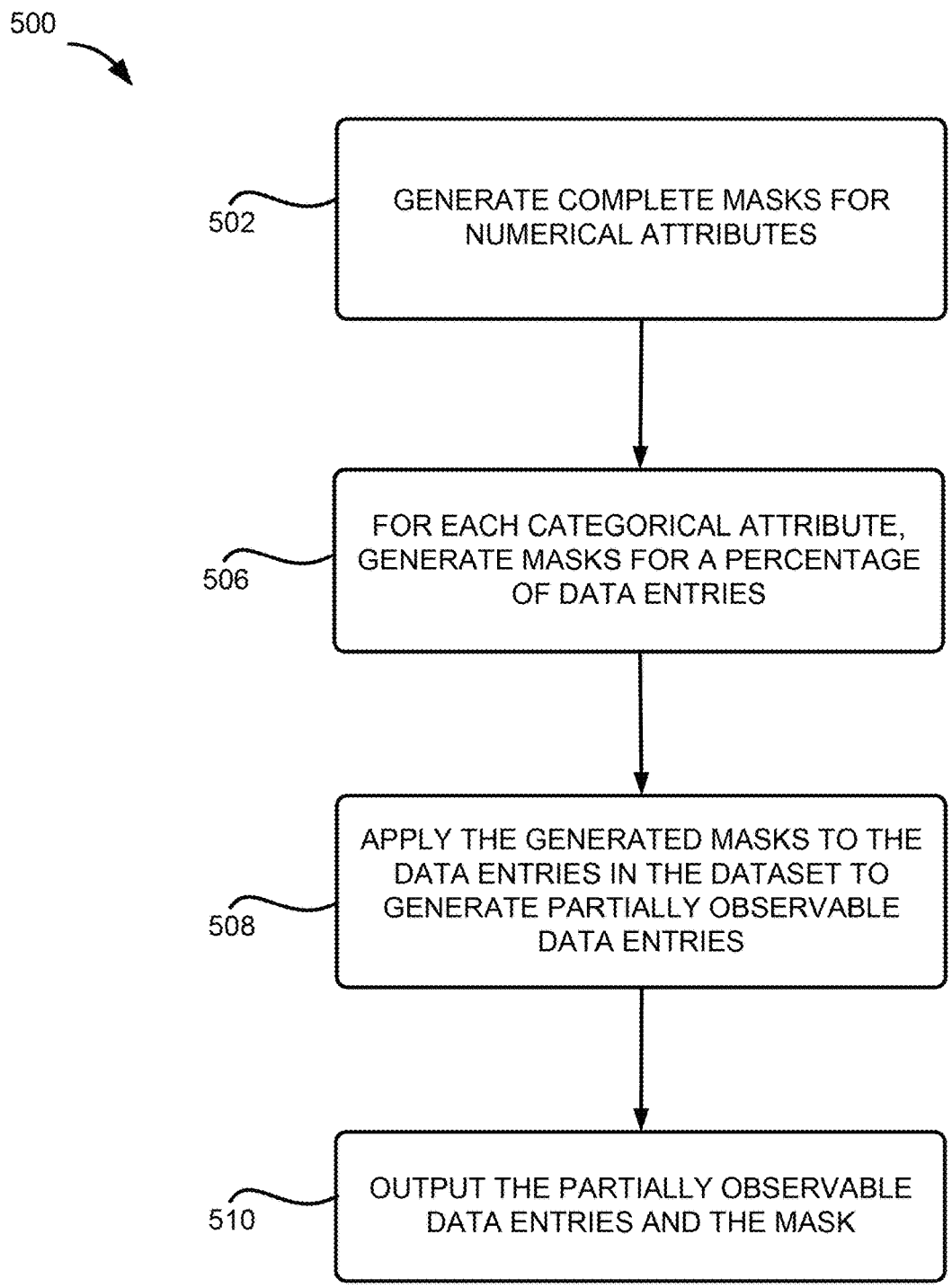
FIG. 5 depicts an example of a process for generating training data for a sample generation model, according to certain embodiments of the present disclosure.
Figure 6:
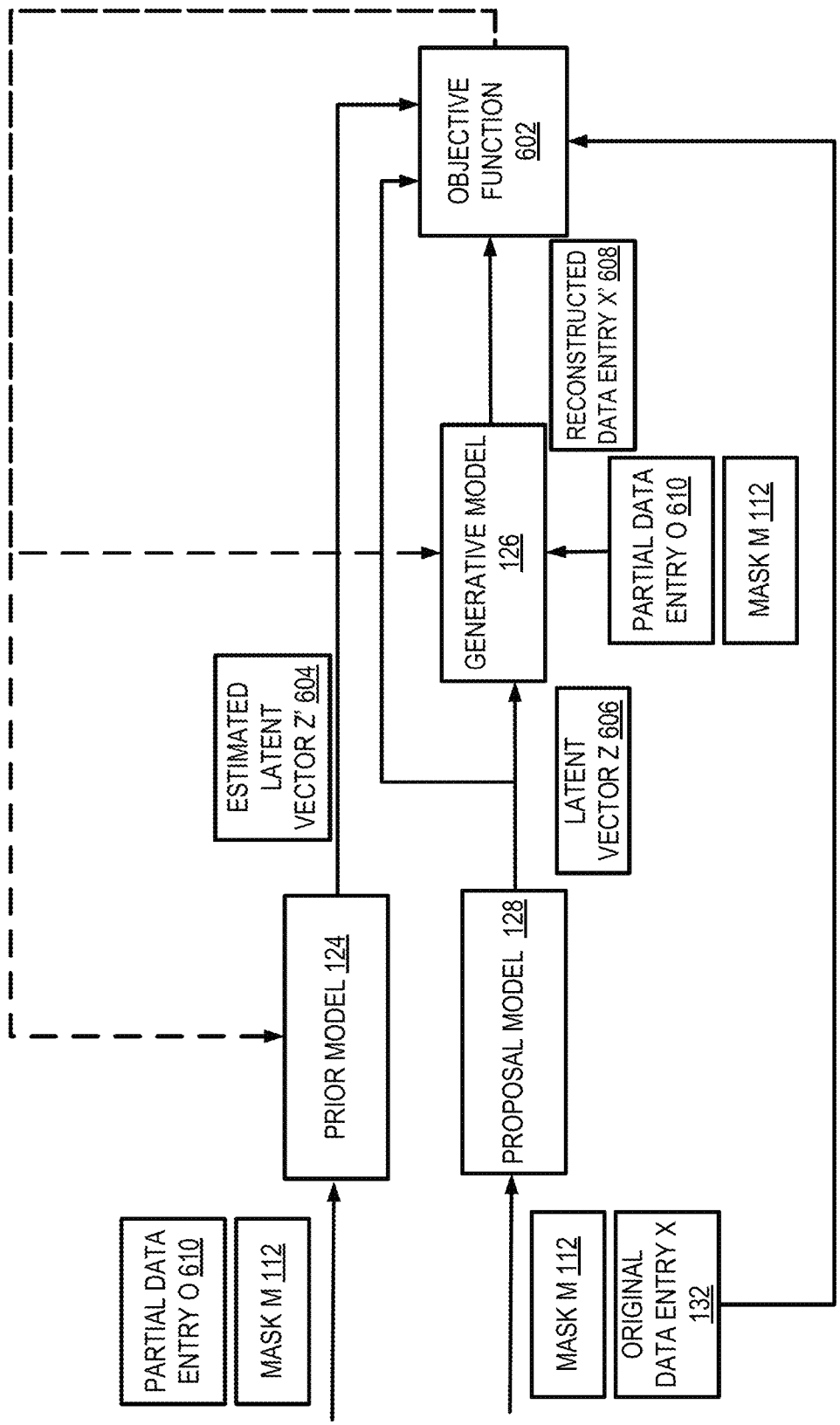
FIG. 6 is a block diagram depicting an example of models included in a sample generation model during the training stage, according to certain embodiments of the present disclosure.

Examples of Computer-Implemented Operations for Training a Sample Generation Model FIG. 2 depicts an example of a process 200 for training a sample generation model according to certain embodiments of the present disclosure. FIG. 2 is described in conjunction with FIGS. 3-5. FIG. 3 depicts an example of a dataset to be queried and for which a sample generation model is built and the masked data attributes, according to certain embodiments of the present disclosure. FIG. 4 depicts an example of a distribution of a numerical data attribute and the normalization of the numerical data attribute using Gaussian distributions. FIG. 5 depicts an example of a process for generating training data for a sample generation model, according to certain embodiments of the present disclosure. FIG. 6 is a block diagram depicting an example of models included in a sample generation model during the training stage, according to certain embodiments of the present disclosure.

One or more computing devices (e.g., the model training computing system 102) implement operations depicted in FIG. 2 by executing suitable program code (e.g., the model training module 104). For illustrative purposes, the process 200 is described with reference to certain examples depicted in the figures. Other implementations, however, are possible.

At block 202, the process 200 involves pre-processing the dataset 134 by the model training module 104. As discussed above with respect to FIG. 1, the model training module 104 pre-processes the data entries 132 in the dataset 134 using the pre-processing module 106 to make the data attributes in the data entries 132 more suitable for model training. FIG. 3 depicts an example of a dataset 134. The dataset 134 includes multiple data entries 132A-132N (which may be referred to herein individually as a data entry 132 or collectively as the data entries 132). Each data entry 132 contains multiple data attributes 302A-302K (which may be referred to herein individually as a data attribute 302 or collectively as the data attributes 302). Although FIG. 3 shows the dataset 134 in a format of a table, any type of data structure can be utilized to represent the dataset 134.

The data attributes 302 are classified into numerical data attributes whose values are numerical numbers and categorical data attributes whose values represent a finite number of categories. The distribution of these attributes may not be suitable for model training. Some of these might be highly skewed or have multiple modes. In order to alleviate the problem, pre-processing is performed. In the pre-processing, the model training module 104 converts the categorical data attributes to number representations, such as integer numbers. Different numbers represent different categorical values of the categorical data attributes. For instance, for categorical data attribute "browser type" having three possible values "Internet Explorer®," "Firefox®," and "Chrome®," its value can be converted to integer numbers 1 to 3 representing the three values of this categorical data attribute.

For numerical data attributes, the model training module 104 adjusts the distribution of the data attributes by using, for example, mode-specific normalization and log transformation. Mode-specific normalization involves identifying the modes in a data distribution and estimating the Gaussian distributions that can be utilized to approximate this data distribution. For example, continuous attributes in real-world datasets often are very complex and do not follow single Gaussian distribution. But a majority of these complex distributions can be represented as a mixture of various simple Gaussian distributions. To identify these mixtures, the model training module 104 employs kernel density estimation(KDE) with a Gaussian Kernel and "scott" based bandwidth parameter selection. If the continuous attribute shows separated peaks in its kernel density plot, the model training module 104 identifies the means and co-variances corresponding to these peaks (or individual Gaussians or modes), for example, using the Gaussian Mixture model. The Gaussian Mixture model is a probabilistic model that assumes all the data points are generated from a mixture of a finite-number of Gaussian distributions with unknown parameters. The Expectation-Maximization (EM) algorithm is used to identify these mixture components.

The model training module 104 further transforms each value $v_i$ of the numerical data attributes in the dataset 134 to one or more probability distributions with the respective expectations from the respective modes identified for that attribute. The values of the numerical data attribute in the dataset 134 are then normalized with the mean and standard deviation of the mode with the highest probability as follows:

$$v'_i = (v_i - \mu_j)/(2\sigma_j) \quad (1)$$

Here, $v_i$ is the value of a continuous attribute and $v'_i$ is the normalized value of the continuous attribute; $\sigma_j$ and $\mu_j$ are the standard deviation and mean vectors obtained from the Gaussian Mixture model; j=argmax(p) and p is the probability distribution of $v_i$ originating from the different modes. As a result, different values of $v_i$ may be represented by different Gaussian models.

FIG. 4 shows an example of the probability density function of the distribution of a numerical data attribute $v_i$ in the dataset 134 and the two Gaussian distributions corresponding to the two modes of the distribution. In this example, the dashed line is the distribution of the numerical data attribute $v_i$. This distribution has two modes $\mu_1$ and $\mu_2$. The two solid lines represent the two Gaussian distributions 402 and 404 approximating the data distribution near the respective modes $\mu_1$ and $\mu_2$. For data attribute values larger than the point A shown in FIG. 4, the Gaussian distribution 402 with the mean at $\mu_2$ is used to normalize the attribute values according to Eqn. (1) shown above. For instance, if $v_i = \mu_2$, the probability of $v_i$ originating from the Gaussian distribution 404 is $p_2$ and the probability of $v_i$ originating from the Gaussian distribution 402 is $p_1$. Since $p_2 > p_1$, j=2 and the mean $\mu_2$ and the variance $\sigma_2$ of the Gaussian distribution 404 are utilized to normalize $v_i$ as shown in Eqn. (1). Likewise, for data attribute values smaller than or equal to point A in FIG. 4, the Gaussian distribution 402 with mean at $\mu_1$ is used to normalize the attribute values according to Eqn. (1) shown above.

FIG. 4 also shows a dotted curve representing a Gaussian distribution if a single Gaussian distribution was used to normalize the numerical data attributes $v_i$. Compared with the approximation using two Gaussian distributions, the single Gaussian distribution approximation is much less accurate in this example. For other numerical data attributes whose distribution has a single mode, single Gaussian normalization may be sufficient.

However, even if a continuous attribute can be normalized with a single mode, it can still be highly skewed making the attributes unsuitable for model training. To address this problem, the model training module 104 further determines the skewness of a numerical data attribute and applies log transformation to reduce the skewness. In some examples, the model training module 104 measures the skewness of an attribute with mean $\mu$, median $\nu$, and standard deviation $\sigma$ as follows:

$$\text{skewness} = (\mu - \nu)/\sigma \quad (2)$$

If the magnitude of skewness is high (e.g., higher than a threshold value of skewness such as 4), then it becomes difficult for any generative network to learn the distribution of that attribute. In that case, the model training module 104 transforms the data into a simple Gaussian distribution, for example, using box-cox transformation. The transformation is parameterized by $\lambda$ and defined as follows:

$$\alpha_i(\lambda) = \begin{cases} \left(\dfrac{(v_i)^\lambda - 1}{\lambda}\right) & \text{if } \lambda \neq 0 \\ \log(v_i) & \text{if } \lambda = 0 \end{cases} \quad (3)$$

In some examples, the model training module 104 estimates $\lambda$ by using maximum likelihood estimation (MLE) based method to identify $\lambda$ that maximizes the log-likelihood of the variable transformation being a normal distribution.

Referring back to FIG. 2, at block 204, the process 200 involves the model training module 104 generating training data 122 using the masking module 110. The training data 122 includes partially observed data entries that are generated by masking the data entries 132. The masking process is designed for queries whose aggregate functions are performed over numerical attributes and conditions are specified on categorical attributes. The masking process enables the sample generation model 114 to learn the distribution of numerical attributes conditioned on the categorical attributes. FIG. 5 shows an example of a process 500 for masking the data entries 132 to generate the partially observed data entries. One or more computing devices (e.g., the model training computing system 102) implement operations depicted in FIG. 5 by executing suitable program code (e.g., the model training module 104). For illustrative purposes, the process 500 is described with reference to certain examples depicted in the figures. Other implementations, however, are possible.

At block 502, the process 500 involves generating masks for numerical data attributes. Because one of the goals for training the sample generation model 114 is to learn the distributions of numerical data attributes, in some examples, the numerical data attributes are completely masked so the values of these numerical data attributes are not visible in the training data 122. In this way, the sample generation model 114 is forced to learn to reconstruct the values of the numerical data attributes. In the example shown in FIG. 3, data attribute 302A and data attribute 302K are numerical data attributes and the values of these two attributes in all the data entries 132A-132N are masked as shown in the shaded areas of FIG. 3.

At block 506, the process 500 involves the model training module 104 generating masks for the categorical data attributes. The values of categorical data attributes are used for two purposes—unmasked for learning conditional distribution and masked for learning distribution independent of that attribute. Thus, in some examples, partial making is performed for the categorical data attributes. For each of these categorical data attributes, the model training module 104 selects a portion of the data entries 132 for masking. For example, in FIG. 3, the model training module 104 masks categorical data attribute 2 for a portion of the data entries 132. In some examples, the model training module 104 randomly or pseudo-randomly selects a percentage x % of the data entries 132 to mask the categorical data attribute 2. The percentage x % can be, for example, 25% or any other number.

In some examples, stratified masking rather than uniform masking is employed to partially mask the categorical data attributes selected for partial masking. Stratified masking masks a percentage x % of data entries having the same value for a categorical data attribute. For example, the dataset 134 has 100 data entries with 50 of them having "Chrome®" as the value of the "browser type" attribute, 45 of them having "Internet Explorer®" as the value of the "browser type" attribute, and 5 of them having "Firefox®" as the value of the "browser type" attribute. Following the stratified masking, the model training module 104 masks x % of the 50 data entries having the value "Chrome®," x % of the 45 data entries 132 having the value "Internet Explorer®," and x % of the 5 data entries 132 having value "Firefox®." Under uniform masking, the model training module 104 would mask x % of the 100 data entries 132 regardless of their values for the "browser type" attribute. It is likely that under the uniform masking, the under-represented group of a categorical data attribute (e.g., the 5 data entries having "Internet Explorer®") may be masked, whereas, under the stratified masking scheme, every group has masked and unmasked data entries. As such, the stratified masking helps the training to capture the distributions of under-represented groups along with the dominating groups.

The number of data attributes that are masked is related to the type of queries that the model is designed to service. The more data attributes are masked, the less information is left in the training data. The model trained using such kind of training data is more suitable to service queries with fewer conditions, and vice versa. For example, the higher the percentage x % is in the stratified masking discussed above, the fewer data attributes are observable in the training data 122. This is similar to the scenario where the queries have fewer conditions. In some cases, information about the possible queries that will be submitted at the client computing device can be obtained. Based on such information, the model training module 104 can determine the number of categorical data attributes to be masked and the percentage used in the stratified masking.

In some examples, the model training module 104 can also select a subset of categorical data attributes and generate complete masks for that subset of categorical data attributes. Since not all categorical attributes would be present as part of any given query, the sample generation model 114 needs to learn the distribution of numerical data attributes given a partial subset of categorical data attributes. To achieve this, the model training module 104 masks a subset of categorical data attributes. In some examples, the model training module 104 generates the subset of categorical data attributes for complete masking by randomly or pseudo-randomly selecting a subset from the categorical data attributes of the dataset 134.

The above masking process can be further improved by accounting for dependencies between the various data attributes. For example, if a data attribute (e.g., age) is correlated with another data attribute (e.g., year of birth), the model training module 104 can mask one of these data attributes without losing information. These dependencies can either be pre-specified (prior information) or learned using other machine learning models. One method can be, for instance, learning a regression with numerical attributes as the dependent variable and categorical values as the independent variable. Once the regression is trained, the obtained coefficients can be used as weights for the masking proportion.

At block 508, the process 500 involves applying the generated masks to the data entries 132 to generate corresponding partially observed data entries. In some implementations, the model training module 104 represents the masks as row vectors, each row vector corresponding to one data entry 132. For the example shown in FIG. 3, a mask $M_j$ is a row vector with length K. Each of the K element in $M_j$ indicates whether the corresponding data attribute 132J is masked or not. The corresponding partially observed data entry $O_j$ is generated by masking the data entry 132J as indicated by $M_j$. At block 510, the model training module 104 outputs the generated masks and the partially observed data entries as training data 122.

Referring back to FIG. 2, at block 206, the process 200 involves the model training module 104 training the sample generation model 114 using the training data 122. In some examples, the sample generation model 114 includes three sub-models: a prior model 124, a generative model 126, and a proposal model 128. The prior model 124 is configured to generate an estimated latent vector from a partially observed data entry and a mask indicating the observable data attributes and unobservable data attributes in the partially observed data entry. The proposal model 128 is configured to generate a latent vector from the original data entry of the dataset and the mask. The generative model 126 is configured to generate the synthetic data entries from the latent vector, the partially observed data entry, and the mask. The training includes modifying parameters of the sample generation model 114 to optimize an objective function. The objective function includes a term capturing the reconstruction error based on the synthetic data entries and a term measuring the statistical distance between the estimated latent vector by the prior model and the latent vector generated by the proposal model. Training the sample generation model 114 thus involves optimizing the objective function to reduce the reconstruction error and the statistical distance.

FIG. 6 is a block diagram depicting an example of sub-models included in a sample generation model 114 during the training stage, according to certain embodiments of the present disclosure. The prior model 124 accepts a partially observed data entry 610, denoted as O, and a mask 112, denoted as M as inputs. The mask 112 indicates the observable data attributes and unobservable data attributes in the partially observed data entry O. Denote the original data entry 132 from which the partially observed data entry O is generated as X. The M, O and X have the following relationship $O_j=(1-M_j)*X_j$, where $O_j$, $M_j$, and $X_j$ are the j-th element of the partially observed data entry O, the mask M, and the original data entry X, respectively, and $1 \le j \le K$. K is the total number of data attributes in X. In this example, M is a binary mask with value 1 indicating masking an attribute and value 0 indicating otherwise.

Based on the partially observed data entry O and the mask M, the prior model 124 is configured to generate an estimated latent vector 604, denoted as Z'. The proposal model 128, on the other hand, accepts the mask M and the original data entry X as inputs and generates latent vector 606, denoted as Z. Because the latent vector Z is generated based on the original, unmasked data entry, the latent vector Z is more accurate than the estimated latent vector Z' and can serve as a reference for the estimated latent vector Z'. The generative model 126 is configured to generate reconstructed data entries 608, denoted as X' based on the latent vector Z, the partially observed data entry O and mask M. The estimated latent vector Z', the latent vector Z, the reconstructed data entries X', and the inputs to these models O, M, and X can be used to construct the objective function 602 for the training.

As can be seen from FIG. 6, given O and M, the sample generation model 114 tries to reconstruct X. Thus, the model is configured to learn the conditional distribution P(X|O, M). To do so, the log-likelihood of this distribution is modeled via the sample generation model 114 as $\log p_{\psi,\theta}(X|O, M)$. Here $\psi$ and $\theta$ are the parameters of the prior model 124 and the generative model 126, respectively, used at the conditional sample generation time. The objective function 602 can thus be constructed to optimize the lower bound of $\log p_{\psi,\theta}(X|O, M)$. For the structure of the sample generation model 114 shown in FIG. 6, the objective function 602 based on the lower bound of $\log p_{\psi,\theta}(X|O, M)$ can be formulated as:

$$\max(E_{q_\phi(Z|X,M)} \log p_\theta(X|Z,O,M) - D_{KL}(q_\phi(Z|X,M) || p_\psi(Z'|O,M))) \quad (4)$$

Here, $q_\phi$ represents the proposal model 128, $p_\psi$ represents the prior model 124, and $p_\theta$ represents the generative model 126. The first term of the objective function, $E_{q_\phi(Z|X,M)} \log p_\theta(X|Z,O,M)$, captures the reconstruction error of X from the latent vector Z of the proposal model 128 given input mask M and observable attributes in the partially observed data entry O. The second term of the objective function, $D_{KL}(q_\phi(Z|X,M) || p_\psi(Z'|O,M))$, is used to minimize the Kullback-Leibler divergence from the distribution of the estimated latent vector Z' to the distribution of the latent vector Z, thereby training the prior model 124 to effectively learn the latent dimension representation capturing the conditional and joint distributions of the data.

Note that, the proposal model 128 is only used while training the sample generation model 114. During run-time, the latent vector Z is generated directly from the prior model 124. The proposal model 128 helps in calculating the KL divergence and performing re-parameterization of Z during training.

In some examples, the prior model 124 can be implemented as a deep neural network with an initial one-hot encoding layer for categorical attributes, followed by multiple dense layers (such as 8 dense layers) of width such as 256 with a rectified linear unit (ReLU) activation and a final dense layer of twice the latent dimension such as 64. The proposal model 128 can be implemented using similar architecture as the prior model 124. The generative model 126 can be implemented with multiple dense layers such as 8 dense layers of width such as 256 with a ReLU activation and a final dense layer with a softmax activation for categorical attributes. In these examples, training of the sample generation model 114 includes modifying parameters of one or more of the prior model 124, the generative model 126, and the proposal model 128 to optimize the objective function as discussed above.

Note that the training can be performed iteratively using different batches of training data 122. One batch of training data 122 can be generated using a subset of the dataset 134 including a group of data entries 132 according to the process described in FIG. 5. A second batch of training data 122 can be generated using another subset of the dataset 134 including a different group of data entries 132 according to the process described in FIG. 5. As a result, the dataset 134 can be divided into multiple groups, and process 500 can be applied to each group to generate a corresponding batch of training data. Because randomness is involved in the process 500, such as the randomly masked subset of categorical data attributes and the randomly selected percentage of data entries for masking, the masks generated for different batches of training data 122 may be different. This enables the sample generation model 114 to be trained with a variety of conditions that might be included in the search queries.

Referring back to FIG. 2, at block 208, process 200 involves the model training module 104 training a cardinality estimator. The cardinality estimator is useful for certain types of queries that request accumulative aggregation, such as sum or total count. For example, if the query requests for a sum as an aggregate, the cardinality estimator can be used to estimate how many rows might be in the original dataset 134 that would satisfy the given condition. The sum is calculated by multiplying the calculated average with the output of the cardinality estimator. Methods such as sketching based, density based, or neural network based can be used to estimate the cardinality for this purpose.

In some implementations, a neural network based cardinality estimator, called neural relation understanding (NARU), can be used. The NARU model is implemented using the masked autoencoder for distribution estimation (MADE) architecture for large datasets. In an example implementation, for a dataset with 10 million data entries, the NARU model has 5 intermediate layers and the size for each layer is [512,256,512,128,1024] (default parameters from the MADE implementation). For a dataset with 50 thousand data entries, a modified version of MADE, called ResMADE architecture, with 5 layers is used. The hidden units for each layer is [256,256,256,256,256] and is trained with a batch size of 64.

At block 210, the process 200 involves the model training module 104 outputting the trained sample generation model 116 and the trained cardinality estimator, and causing these models to be sent to one or more client computing system 136. As discussed above, at run-time, the proposal model 128 is no longer needed and thus the trained sample generation model 116 includes the prior model 124 and the generative model 126.

Figure 7:
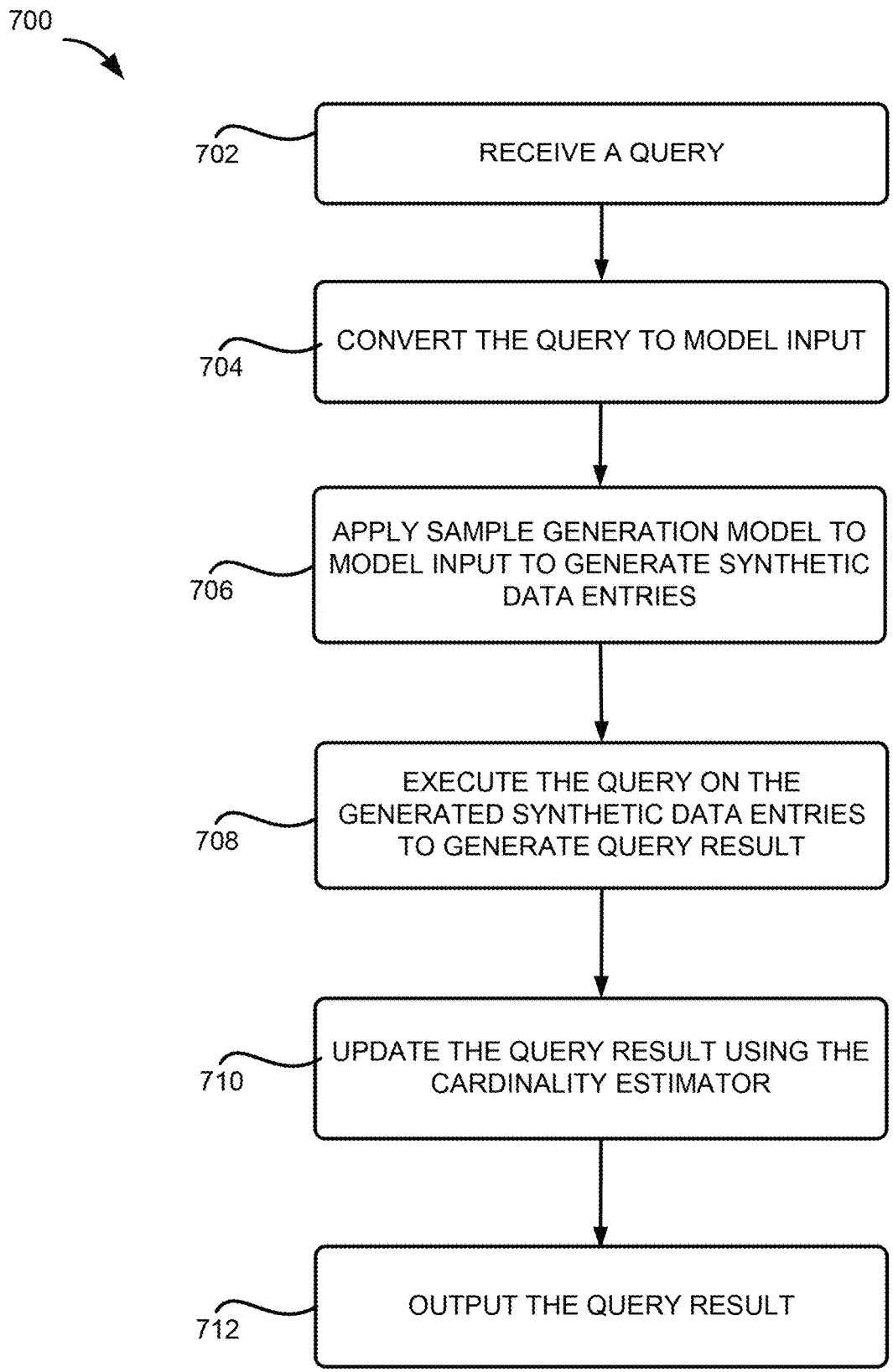
FIG. 7 depicts an example of a process for serving a query using the sample generation model, according to certain embodiments of the present disclosure.
Figure 8:
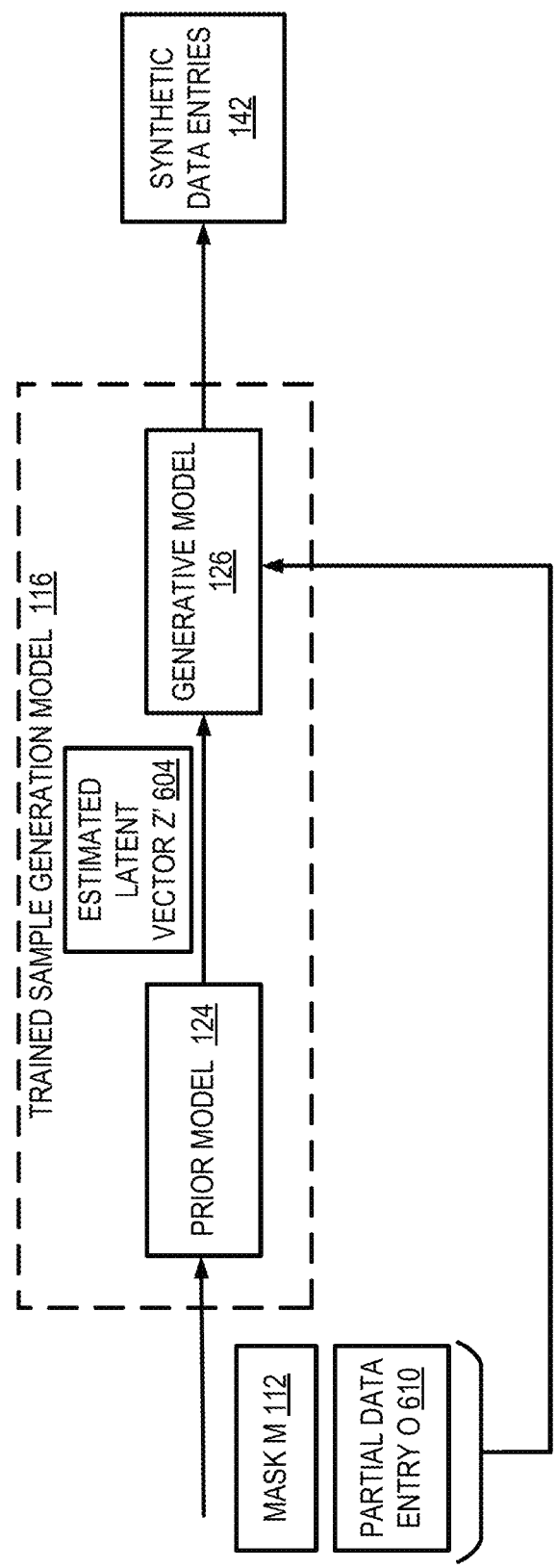
FIG. 8 is a block diagram depicting an example of models included in a sample generation model during runtime, according to certain embodiments of the present disclosure.

Examples of Computer-Implemented Operations for Serving a Query Using a Trained Sample Generation Model FIG. 7 depicts an example of a process for serving a query using the sample generation model, according to certain embodiments of the present disclosure. FIG. 7 is described in conjunction with FIG. 8. FIG. 8 is a block diagram depicting an example of models included in a sample generation model during runtime, according to certain embodiments of the present disclosure. One or more computing devices (e.g., the client computing system 136) implement operations depicted in FIG. 7 by executing suitable program code (e.g., the approximate query module 144). For illustrative purposes, the process 700 is described with reference to certain examples depicted in the figures. Other implementations, however, are possible.

At block 702, the process 700 involves the approximate query module 144 receiving a query 146. The query can be, for example, an aggregate query (e.g., a query requesting an aggregation of the search results, such as summation, averaging) associated with conditions (e.g., conditions specified in the WHERE clause of the query). For example, for a dataset T with r data entries and N as the set of numerical data attributes and C as the set of categorical data attributes, the query 146 can have the following form:

SELECT $v_y$, AGG($c_x$) as agg
FROM T WHERE conditions
GROUP BY $c_y$
ORDER BY agg where $c_x \in N$, i.e., $c_x$ is a numerical attribute, and $c_y \in C$, i.e., $c_y$ is a categorical attribute. $v_y$ denotes the different values taken by the categorical variable $c_y$. Conditions contain a list of (categorical attributes, value, operator) tuples i.e. ($c_j$, $v_j$, o) such that $v_j$ is a value taken by the variable $c_j$, $c_j \in N$ and $o \in \{=, \neq\}$. AGG can be any aggregate function from average, sum, and total count.

At block 704, the process 700 involves converting the query 146 to inputs to the trained sample generation model 116. To do so, the approximate query module 144 parses the query 146 and extracts conditions specified in the query 146. Depending on the conditions specified in the query 146, one or multiple inputs to the trained sample generation model 116 can be generated. For example, for an input query Q=($c_{agg}$, F, $c_g$) with a GROUP BY function on attribute $c_g$, the approximate query module 144 transforms it into multiple sub-queries. Each sub-query is q=($c_{agg}$,F') where F'=F∪$\{v_g,c_g,=\}$. Here, $\{v_g, c_g, =\}$ is a (categorical attributes, value, operator) tuple as discussed above, and $c_g$ takes different values of the categorical data attribute $v_g$ for different sub-queries. Each sub-query q in the above notation transforms to a model input (O, M), where O=$\{v_i$ if $c_i \in F'$, else NaN$\}$ and M=$\{0$ if $c_i \in F'$, else $1\}$. If the input query 146 does not have a GROUP BY function, the query Q=($c_{agg}$, F) can be directly transformed to O and M as described above.

At block 706, the process 700 involves the approximate query module 144 applying the trained sample generation model 116 to the model inputs to generate synthetic data entries 142. In some examples, the approximate query module 144 provides each of the model input(s) (O, M) to the trained sample generation model 116 to generate synthetic data entries 142. If the query 146 has been transformed into multiple sub-queries, the approximate query module 144 can generate multiple sets of synthetic data entries 142, one for each sub-query. The approximate query module 144 further combines these multiple sets of synthetic data entries 142. Because the trained sample generation model 116 can generate the synthetic data entries 142 with high accuracy, the number of synthetic data entries 142 can be maintained at a low scale, such as a total of 2000 data entries. FIG. 8 shows an example of a block diagram of the trained sample generation model 116 during runtime. The model input(s) (O, M) are provided to both the prior model 124 and the generative model 126. The prior model 124 generates the estimated latent vector 604 based on the model input (O, M). Based on the estimated latent vector 604 and the model input (O, M), the generative model 126 generates the synthetic data entries 142.

Referring back to FIG. 7, at block 708, the process 700 involves the approximate query module 144 executing the query 146 on the synthetic data entries 142 generated by the trained sample generation model 116 to generate the query results 148. The approximate query module 144 further computes the aggregate function on $c_{agg}$ attribute if the query 146 includes an aggregation function. At block 710, the process 700 involves the approximate query module 144 updating the query results 148 using the cardinality estimator if the query results are related to the cardinality of the query. For instance, if the aggregation function is sum or the total count, then the approximate query module 144 estimates the cardinality of the query using the cardinality estimator and updates the query result by multiplying the aggregation value with the estimated cardinality.

At block 712, the process 700 involves outputting the query result. The approximate query module 144 can cause the query result to be displayed on a display device of the client computing system 136 or be transmitted to a remote device, or both.

Note that the above describes handling the GROUP BY function by transforms the query into multiple sub-queries based on the number of values of the categorical data attribute on which the GROUP BY is performed. Alternatively, or additionally, the approximate query module 144 can use the conditions in the query 146 to generate one single set of synthetic data entries 142 and then perform GROUP BY on the synthetic data entries 142 based on the search results.

The approach proposed herein also supports JOIN operation on two datasets. For example, the model training computing system 102 can train separate sample generation models 114 on the two separate datasets. The two trained sample generation models are transmitted to the client computing system 136. At the run-time, each of the two trained sample generation models is executed to generate separate synthetic data entries 142. The approximate query module 144 performs a JOIN operation on the generated synthetic data entries 142 from these two models. The approximate query module 144 further calculates the aggregate on the joined synthetic data entries 142. Alternatively, or additionally, the approximate query module 144 can first perform a full join between the two datasets before training a single sample generation model 114. At run-time, the approximate query module 144 uses the trained sample generation model 116 to generate synthetic data entries 142 on which aggregates will be performed.

The query-oriented approximate query processing proposed herein can also handle nested sub-queries, such as nested sub-queries when the outer query does not have any non-transitive predicate, i.e. a predicate that cannot be pushed to the inner query without modifying its logic. An example of such a nested query is as follows:

```
SELECT C, AGG(N) as agg
FROM
    SELECT attribute_list_with renaming
    FROM dataset
    WHERE conditions_inner_query
    WHERE conditions_outer_query
    GROUP BY C
    ORDER BY agg
``` where $C \in$ Attributes, i.e., C denotes a categorical attribute for Group By and $N \in$ Attributes, i.e., N denotes a numerical attribute on which aggregate is to be performed. This type of queries can be handled in one pass by transforming the conditions_inner_query as additional conditions to the conditions_outer_query.

Another type of sub-queries that can be handled using the proposed model are queries that can be decomposed into a logical combination of multiple queries of the form $Q=(c_{agg}, F, c_g)$. An example of such a nested query is as follows:

```
SELECT C_o, AGG(N_o) as agg
FROM dataset
WHERE conditions_outer_query
AND W = (
    SELECT C_i, AGG(N_i)
    FROM dataset
    WHERE conditions_inner_query
    GROUP BY C_i
    ORDER BY 2 LIMIT 1
)
GROUP BY C_o
``` where $C_o$ and $C_i \in$ Attributes, i.e. $C_o$ and $C_i$ denote categorical attributes for GROUP BY and $N_o$ and $N_i \in$ Attributes, i.e. $N_o$ and $N_i$ denote numerical attributes on which aggregate are performed. Such queries are handled by the proposed model using multiple-passes. First, the inner queries (at the highest depth, e.g., D) is evaluated and then the output from that query is used to recursively compute query at lower depths (e.g., D−1) until the base query is evaluated.

In addition, the model architecture presented herein is independent of dataset size, continuously incoming data leading to increasing dataset size does not change the model. In fact, more available data would help the model learn better and further improve the performance of the model. Note that, if the distribution of the incoming data changes, the model would need to be re-trained. Re-training of the model can be a background offline tasks performed at either regular intervals or based on statistical tests on the incoming data distribution.

Figure 9:
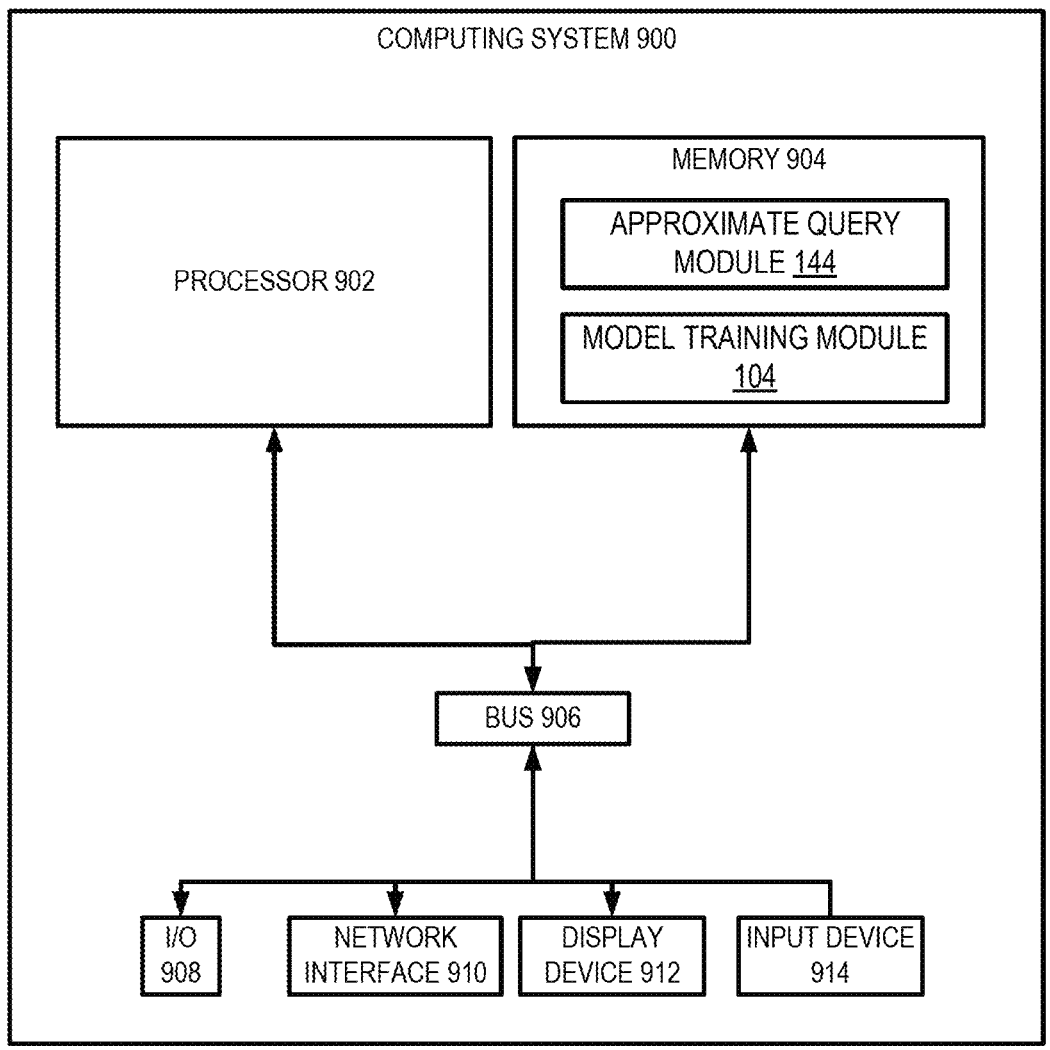
FIG. 9 depicts an example of a computing system that executes a software application for performing certain aspects of the present disclosure.

Computing System Example for Implementing Query-Oriented Approximate Query Processing Based on Machine Learning Techniques Any suitable computing system or group of computing systems can be used for performing the operations described herein. For example, FIG. 9 depicts an example of a computing system 900 that can implement one or more devices in the computing environment of FIG. 1. In some embodiments, the computing system 900 includes a processing device 902 that executes the model training module 104 or the approximate query module 144, a memory that stores various data computed or used by the model training module 104 or the approximate query module 144, an input device 914 (e.g., a mouse, a stylus, a touchpad, a touchscreen, etc.), and a display device 912 that displays a user interface of the approximate query module 144 for receiving the query 146 or for displaying the query results 148. For illustrative purposes, FIG. 9 depicts a single computing system on which the model training module 104 or the approximate query module 144 is executed, and the input device 914 and display device 912 are present. But these applications, datasets, and devices can be stored or included across different computing systems having devices similar to the devices depicted in FIG. 9.

The depicted example of a computing system 900 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as an input device 914, a display device 912, or other input or output devices. For example, the computing system 900 is shown with one or more input/output ("I/O") interfaces 908. An I/O interface 908 can receive input from input devices or provide output to output devices. One or more buses 906 are also included in the computing system 900. The buses 906 communicatively couples one or more components of a respective one of the computing system 900.

The computing system 900 executes program code that configures the processing device 902 to perform one or more of the operations described herein. The program code includes, for example, the model training module 104, the approximate query module 144, or other suitable applications that perform one or more operations described herein.

The program code may be resident in the memory device 904 or any suitable computer-readable medium and may be executed by the processing device 902 or any other suitable processor. In some embodiments, all modules in model training module 104 or the approximate query module 144 are stored in the memory device 904, as depicted in FIG. 9. In additional or alternative embodiments, one or more of these modules from the model training module 104 or the approximate query module 144 are stored in different memory devices of different computing systems.

In some embodiments, the computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices (e.g., a computing device that receives inputs for the model training module 104 or the approximate query module 144 or displays outputs of the model training module 104 or the approximate query module 144) via a data network using the network interface device 910.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. A display device 912 can include any device or group of devices suitable for providing visual, auditory, or other suitable sensory output. Non-limiting examples of the display device 912 include a touchscreen, a monitor, a separate mobile computing device, etc.

Although FIG. 9 depicts the input device 914 and the display device 912 as being local to the computing device that executes the model training module 104 or the approximate query module 144, other implementations are possible. For instance, in some embodiments, one or more of the input device 914 and the display device 912 can include a remote client-computing device that communicates with the computing system 900 via the network interface device 910 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method, comprising:
    accessing, by a model training computing system, a dataset comprising a plurality of data entries stored in a datastore;
    training, by the model training computing system, a sample generation model via a training process, the sample generation model comprising a plurality of machine learning models including a prior model, a proposal model, and a generative model, wherein at least one of the plurality of machine learning models is a neural network model, the training process comprises:
    generating training data from the dataset by masking a portion of the data entries in the dataset to generate a plurality of partially observed data entries,
    generating, with the prior model of the sample generation model, an estimated latent vector from at least a partially observed data entry in the training data,
    generating, with the proposal model of the sample generation model, a latent vector from a data entry of the dataset and a mask corresponding to the partially observed data entry, and
    generating, with the generative model of the sample generation model, synthetic data entries from at least the latent vector and the partially observed data entry, and
    modifying parameters of the sample generation model to optimize an objective function comprising a first term determined using the synthetic data entries generated by the generative model and a second term determined using the estimated latent vector generated by the prior model and the latent vector generated by the proposal model; and causing, by the model training computing system, the trained sample generation model to be transmitted to a client computing device, wherein the sample generation model is usable to generate synthetic data entries according to conditions specified in a query for the dataset to service the query without querying the dataset stored in the datastore and to output a query result and to output a query result.

2. The computer-implemented method of claim 1, wherein each of the plurality of data entries in the dataset comprises a plurality of data attributes, and the plurality of data attributes are classified into categorical data attributes and numerical data attributes, and generating the training data from the dataset comprises:

extracting a set of data entries from the plurality of data entries of the dataset;

masking the numerical data attributes of the set of data entries; and for each of categorical data attributes, masking the categorical data attribute in a percentage of the set of data entries.

3. The computer-implemented method of claim 2, wherein masking the categorical data attribute in a percentage of the set of data entries comprises:

identifying data entries in the set of data entries that have a same value for the categorical data attribute; and masking the categorical data attribute in the percentage of the identified data entries.

4. The computer-implemented method of claim 2, wherein generating the training data from the dataset further comprises:

extracting a second set of data entries from the plurality of data entries of the dataset;

masking the numerical data attributes of the second set of data entries; and for each of the categorical data attributes, masking the categorical data attribute in a percentage of the second set of data entries;

wherein training the sample generation model comprises:

training, in a first iteration, the sample generation model using the masked set of data entries; and training, in a second iteration, the sample generation model using the masked second set of data entries.

5. The computer-implemented method of claim 1, wherein applying the mask corresponding to the partially observed data entry on the data entry generates the partially observed data entry; and the second term in the objective function measures a statistical distance between the estimated latent vector generated by the prior model and the latent vector generated by the proposal model.

6. The computer-implemented method of claim 1, wherein each of the plurality of data entries in the dataset comprises a plurality of data attributes, and the plurality of data attributes are classified into categorical data attributes and numerical data attributes, and the method further comprising:

pre-processing the numerical data attributes in the dataset by one or more of:

representing one or more of the numerical data attributes using one or more Gaussian distributions; or transforming one or more of the numerical data attributes into a Gaussian distribution.

7. The computer-implemented method of claim 1, further comprising:

generating a cardinality estimator using the dataset, the cardinality estimator configured to estimate a cardinality of a query; and causing the cardinality estimator to be transmitted to a client computing device, wherein the cardinality estimator is usable to estimate the cardinality of the query to generate results for the query.

8. The computer-implemented method of claim 1, wherein the dataset is generated by joining two or more separate datasets and the trained sample generation model is usable to generate synthetic data entries for a query comprising a join operation.

9. The computer-implemented method of claim 1, wherein the trained sample generation model is configured to execute in a web browser installed on the client computing device.

10. A non-transitory computer-readable medium having program code that is stored thereon, the program code executable by one or more processing devices for performing operations comprising:

generating inputs corresponding to a query for a dataset stored in a datastore, the inputs comprising at least a partially observed data entry and a mask vector according to a condition specified in the query, wherein the partially observed data entry comprising a plurality of data attributes that contain observable data attributes having associated values and unobservable data attributes, and the mask vector indicates the observable data attributes in the data entry;

applying a sample generation model to the generated inputs to generate synthetic data entries, wherein the sample generation model comprising a plurality of machine learning models including a prior model and a generative model, and wherein at least one of the plurality of machine learning models is a neural network model, generating the synthetic data entries comprising:

generating, with the prior model of the sample generation model, a latent vector from at least the partially observed data entry, and generating, with the generative model of the sample generation model, the synthetic data entries from at least the latent vector and the partially observed data entry;

executing the query on the generated synthetic data entries to generate a query result without querying the dataset stored in the datastore; and outputting the query result.

11. The non-transitory computer-readable medium of claim 10, wherein the operations further comprise:

applying a cardinality estimator to the query to estimate a cardinality of the query; and updating the query result using the cardinality of the query before outputting the query result.

12. The non-transitory computer-readable medium of claim 10, wherein the operations further comprise:

generating second inputs corresponding to a second query, the second inputs comprising at least a second partially observed data entry and a second mask vector according to a condition specified in the second query;

applying the sample generation model to the generated second inputs to generate a second set of synthetic data entries;

executing the second query on the second set of synthetic data entries to generate a second query result; and outputting the second query result.

13. The non-transitory computer-readable medium of claim 10, wherein:

the query specifies a categorical attribute used for grouping the query result and the categorical attribute has L different values;

generating the inputs corresponding to the query comprises:

generating L conditional queries for the L different values of the categorical attribute, and for each of the L conditional queries, generating an input comprising a partially observed data entry containing a corresponding value of the categorical attribute and a mask vector according to the condition; and applying the sample generation model to the generated inputs to generate the synthetic data entries comprises:

applying the sample generation model to each of the generated inputs to generate a corresponding subset of synthetic data entries, and combining the L subsets of synthetic data entries to generate the synthetic data entries.

14. The non-transitory computer-readable medium of claim 10, wherein the operations further comprise:

determining that a third query includes a join operation joining two separate datasets; and applying another sample generation model that is trained using data from a joined dataset generated by joining the two separate datasets to generate synthetic data entries for the third query.

15. The non-transitory computer-readable medium of claim 10, wherein the query is a nested query comprising an inner query condition and a first outer query condition, wherein the operations further comprise:

transforming the inner query condition to a second outer query condition, wherein generating the inputs corresponding to the query comprises generating the partially observed data entry and the mask vector according to the first outer query condition and the second outer query condition.

16. A system for performing approximate query processing, the system comprising:

a processing device; and a non-transitory computer-readable medium communicatively coupled to the processing device, the non-transitory computer-readable medium configured to store a sample generation model, the sample generation model comprising a plurality of machine learning models including a prior model, and a generative model, wherein the processing device is configured to execute program code stored in the non-transitory computer-readable medium and thereby perform operations comprising:

generating inputs corresponding to a query that requests to select a set of data entries from a dataset stored in a datastore that satisfy one or more conditions, the inputs comprising at least a partially observed data entry and a mask vector according to the one or more conditions, wherein the partially observed data entry comprising a plurality of data attributes that contain observable data attributes having associated values and unobservable data attributes, and the mask vector indicates the observable data attributes in the data entry;

applying the sample generation model to the generated inputs to generate synthetic data entries, generating the synthetic data entries comprising:

generating, by the prior model of the sample generation model, an estimated latent vector from at least the partially observed data entry in the generated inputs; and generating, by the generative model of the sample generation model, the synthetic data entries based on the partially observed data entry in the generated inputs and the estimated latent vector;

executing the query on the synthetic data entries to generate a query result without querying the dataset stored in the datastore; and outputting the query result.

17. The system of claim 16, wherein the operations further comprise:

applying a cardinality estimator to the query to estimate a cardinality of the query; and updating the query result using the cardinality of the query before outputting the query result.

18. The system of claim 16, wherein the operations further comprise:

generating second inputs corresponding to a second query, the second inputs comprising at least a second partially observed data entry and a second mask vector according to a condition specified in the second query;

applying the sample generation model to the generated second inputs to generate a second set of synthetic data entries;

executing the second query on the second set of synthetic data entries to generate a second query result; and outputting the second query result.

19. The system of claim 16, wherein:

the query specifies a categorical attribute used for grouping the query result and the categorical attribute has L different values;

generating the inputs corresponding to the query comprises:

generating L conditional queries for the L different values of the categorical attribute, and for each of the L conditional queries, generating an input comprising a partially observed data entry containing a corresponding value of the categorical attribute and a mask vector according to the one or more conditions; and applying the sample generation model to the generated inputs to generate the synthetic data entries comprises:

applying the sample generation model to each of the generated inputs to generate a corresponding subset of synthetic data entries, and combining the L subsets of synthetic data entries to generate the synthetic data entries.

20. The system of claim 16, wherein the operations further comprise:

determining that a third query includes a join operation joining two separate datasets; and applying another sample generation model that is trained using data from a joined dataset generated by joining the two separate datasets to generate synthetic data entries for the third query.

* * * * *